United States Patent

Pietrykowski et al.

[11] Patent Number: 5,133,387
[45] Date of Patent: Jul. 28, 1992

[54] FLUID PULSATION DAMPENER HAVING SPIRAL GROOVED BELLOWS

[75] Inventors: Gabriel J. Pietrykowski; Lawrence W. White, both of Bryan, Ohio

[73] Assignee: The Aro Corporation, Bryan, Ohio

[21] Appl. No.: 585,407

[22] Filed: Sep. 20, 1990

[51] Int. Cl.$^5$ ................................ F16L 55/04
[52] U.S. Cl. ........................ 138/30; 138/26; 220/721
[58] Field of Search ............ 138/26, 30, 31, 121, 138/122, 173, DIG. 10; 220/85 B; 417/540; 383/120

[56] References Cited

U.S. PATENT DOCUMENTS

| | | | |
|---|---|---|---|
| 2,360,590 | 10/1944 | Schweller | 138/30 |
| 2,899,110 | 8/1959 | Parker | 220/85 B |
| 2,918,090 | 12/1959 | Shelly | 138/30 |
| 3,061,039 | 10/1962 | Peters | 138/30 |
| 3,099,189 | 7/1963 | Blondiau | 138/30 |
| 3,230,975 | 1/1966 | Mercier | 138/30 |
| 3,273,577 | 9/1966 | Moore | 138/30 |
| 3,422,853 | 1/1969 | Schmid | 138/30 |
| 3,474,844 | 10/1969 | Lindstrom et al. | 383/120 |
| 3,862,646 | 1/1975 | Tarsha | 138/31 |
| 3,865,270 | 2/1975 | Petersson | 220/85 B |
| 3,939,872 | 2/1976 | Wentworth | 138/31 |
| 4,691,739 | 9/1987 | Gooden | 138/31 |
| 4,777,982 | 10/1988 | Borowitz et al. | 138/30 |
| 4,911,204 | 3/1990 | Martin | 138/30 |

FOREIGN PATENT DOCUMENTS

| | | | |
|---|---|---|---|
| 1389226 | 1/1965 | France | 220/85 B |
| 1030901 | 2/1989 | Japan | 138/30 |

Primary Examiner—James E. Bryant, III
Attorney, Agent, or Firm—Allegretti & Witcoff, Ltd.

[57] ABSTRACT

A bellows is comprised of a unitary body formed of relatively thin annular walls, open at one end and closed at the other. The walls are constructed and arranged as a spiral groove, whereby the bellows can be fabricated from plastic by injection molding in a relatively inexpensive fashion. The bellows can be formed of two layers joined to one another, a backup layer formed of metal or plastic and a protective layer formed of plastic such as PFA and PVDF.

6 Claims, 1 Drawing Sheet

FLUID PULSATION DAMPENER HAVING SPIRAL GROOVED BELLOWS

BACKGROUND OF THE INVENTION

This invention pertains to a novel bellows member, and to a unique method of making such a bellows member. In addition, this invention pertains to a pulsation dampener having the novel bellows member.

Bellows are formed in a variety of ways depending upon material. Generally, whether the material is metal, plastic or elastomeric, the wall of the bellows have a convoluted cross sectional configuration to provide for expansion and contraction. A metal bellows can be formed to shape by dies or molds operated by hydraulic pressure. Rubber or like elastomer can be blow molded to form a bellows. Some plastics cannot be blow molded or compression molded to form a bellows, but can be machined. However, such machining of a plastic bellows is labor intensive and therefore costly.

Thus, an object of the present invention is to create a novel plastic bellows that can be injection molded at reasonable cost.

Another object of this invention is to provide a novel bellows having a body with a relatively thin annular wall open at one end and closed at the other, with the wall formed with as a spiral groove convolution.

Yet another object of this invention is to provide a chemically resistant bellows for a variety of fluid handling applications, for example, in a pulsation dampener for a fluid system, said bellows comprising a unitary injection molded body having an annular wall with a corkscrew or spiral shaped convolution configuration.

A further object of the present invention is to provide a bellows having a unitary body with a relatively thin wall formed as a spiral groove and at least one protective layer, the wall of the protective layer being complementary to the wall of the body and being connected to the body by screwing same onto said body.

Other objects and advantages of this invention will be made more apparent in the following description.

BRIEF DESCRIPTION OF THE DRAWINGS

There is shown in the drawing, FIG. 1, a cross sectional view of a pulsation dampener incorporating a bellows embodying the present invention.

DETAILED DESCRIPTION OF THE PRESENT INVENTION

Figure 1:
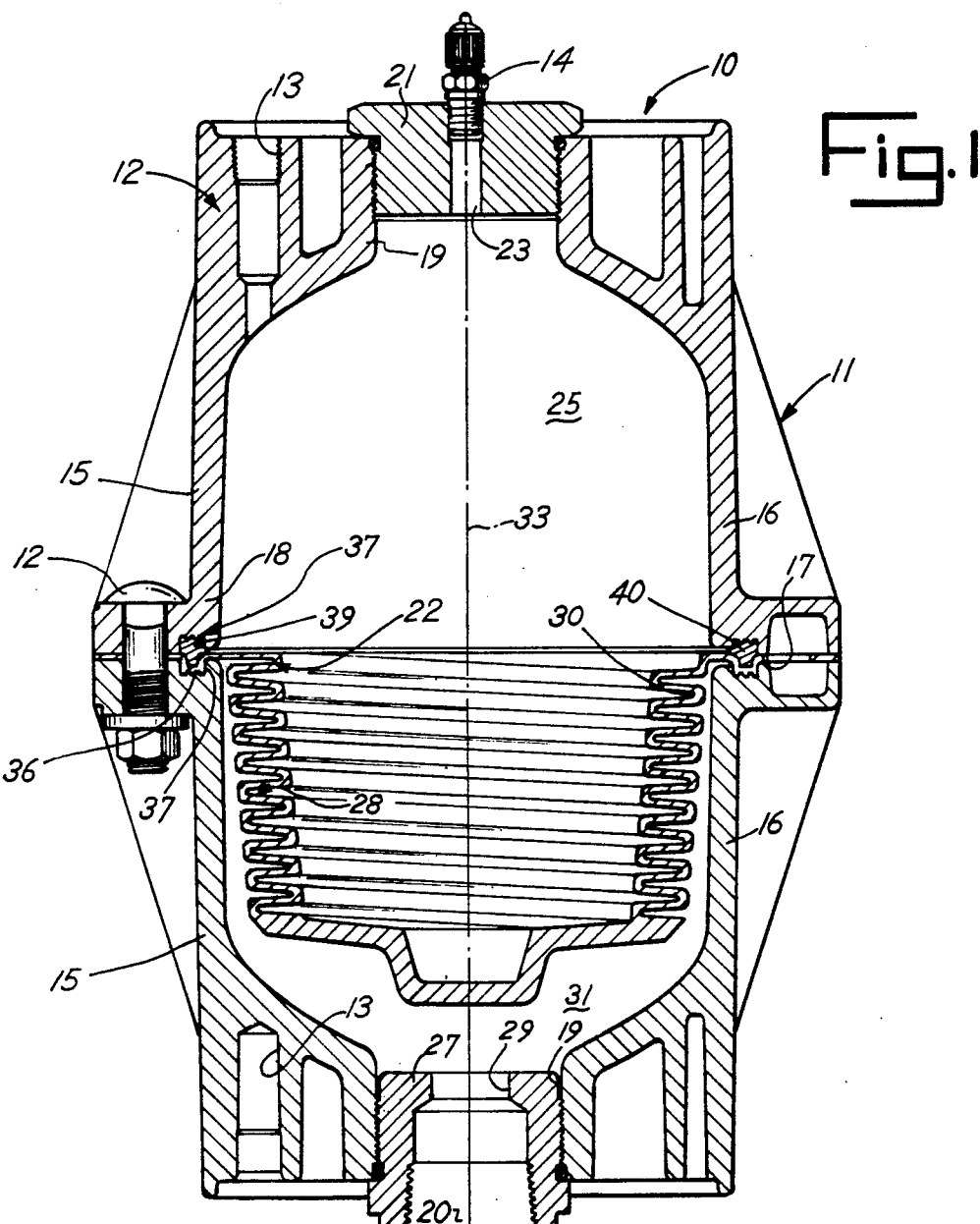

Referring to FIG. 1 of the drawing, there is shown a pulsation dampener 10 adapted to be connected in a fluid system (not shown) via a fluid inlet passage 20 to dampen fluid vibration or pulsation in the system. The pulsation dampener 10 comprises a housing 11, which includes two identical housing members (a first housing member and a second housing member) 15, suitably joined together, for example, by bolt 12 along a complementary, planar surface 17. Each housing member 15 includes a center axial passage 19 at one end, an intermediate section 16 and a flange 18 with flange surface 17 at the opposite axial end. A plug 21 is threaded into the threaded center axial passage 19 of the upper housing member 15. Plug 21 includes an axial passage 23, which is also threaded and receives an inlet valve member 14. Valve member 14 is a check valve which permits charging of the reservoir 25 and retention of pressurized fluid in reservoir 25. The lower housing member 15 is also provided with an axial fitting 27 threaded into passage 19 and having a passage or port 20 for communication of the pulsation dampener 10 to a fluid system (not shown) which may have pulsations therein to be dampened. The housing 11 of the pulsation dampener 10 is divided into two chambers 25, 31 isolated from one another by bellows or bellows means 22 of the present invention. A passage 13 in each housing member 15 may be plugged, or may connected to additional reservoir volume, or may receive an indicator or gauge. In any event, passage 13 in upper housing provides access to the upper chamber 25.

In review, in FIG. 1, bellows means, a bellow member or bellows 22 separates the two housing members 15, thereby defining an upper chamber 25 and a lower chamber 31. Typically, chamber 25 is pressurized, and chamber 31 is connected via port 29 to a fluid system. The bellows 22 includes multiple convolutions 28 in cross section which are connected or continued as a single spiral about the axis 33. The bellows 22 expands or contracts in response to the variation of pressure in reservoir 31.

Figure 2:
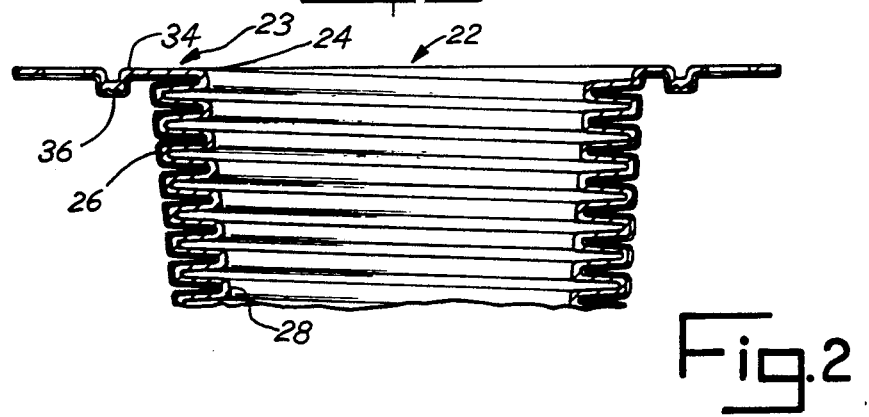
FIG. 2, which is a cross sectional view of an alternative embodiment of the bellows.

As shown in FIG. 2, the bellows means 22 may be comprised of a back-up layer, first bellow layer, or inside layer 24 formed of metal or plastic or elastomer, and a chemical resistant layer second bellows layer, protective layer, or outside layer 26 formed of a chemically resistant moldable plastic. The first bellows layer 24 and the second bellows layer 26 have an inner surface and an outer surface. In one form of the invention, the first bellows layer 24 is screwed into the second bellows layer 26 in such a manner that the inner surface of the second bellows 26 layer essentially encapsulates the outer surface of the first bellows layer 24. The inside layer 24 typically faces an air or like non-hostile environment. The outside layer 26 typically faces a chemically hostile system or environment. The bellows layers 24 and 26 are uniquely formed with convolutions 28 in the form of a spiral groove.

Stated somewhat differently, the bellows 22 is formed with an open end and a closed end, and the side wall thereof is convoluted, defining convolutions 28 which are pitched relative to a central axis 33 to form a screw-like exterior. The convolutions 28 are rounded at the corners 30 (see FIG. 1) to reduce stress and help reduce possible fatigue failure as would occur if the corners 30 of the convolutions 28 were sharp.

The upper, annular periphery 23 of the bellows 22 defines an enlarged flange 34 surrounding the open end of the bellows 22. The layer 26 also has a flange 36 surrounding the open end. The annular flanges 34 and/or 36 are received within opposed annular recesses 37 defined in the faces or complementary surfaces 17 of housing member 15 for securing the bellows means 22 in place within the housing. Each annular recess 37 has a plurality of ridges. The annular flanges 34 and/or 36 provide a seal between the surfaces 17. The annular flanges, 34 and 36, each contain a plurality of ridges adapted to cooperate with the plurality of ridges on the flanges of the housing members 15.

Note that the seal is effected by utilizing an O-ring seal 39 of unique cross sectional shape which cooperates with an annular seal section of flange 34, as shown in FIG. 1. The O-ring has a first surface that has a plurality of ridges that cooperate with the plurality of ridges of one of the annular recesses 37. The O-ring also has a second surface, opposing the first surface, that cooperates with the annular groove of the annular flange of the bellows. Thus, the grooves 37 are identical and cooperate with O-ring 39 and flange 34 to seal the bellows 22 between members 15.

By forming the bellows 22 with a unique screw-like configuration, several advantages are obtained. The bellows 22 can be formed entirely or partially of injection moldable compounds, which can be readily unscrewed from the injection molds. The injection moldable compounds may be fluorinated thermoplastics (such as polyvinylidene fluoride (PVDF)); which are materials having highly desirable, chemical resistant properties, but which are not capable of being injection molded when the convolutions were parallel to the base of the bellows means and the wall was not pitched or formed like a screw. Previous attempts to provide a chemically resistant layer from materials such as PFA or PVDF etc. were very costly and labor intensive, requiring machining of the extruded or similarly formed material. The construction of the present constructions greatly reduces costs by eliminating machining and permitting the bellows 22 to be injection molded, either as one piece, or as two pieces. Thus, the layer 24 could be metal or plastic or elastomeric and serve as a reinforcement for the protective layer 26.

In addition, the layers 24 and 26 could be formed of different materials to readily and economically handle the entirely different environments on opposite sides of the bellows means 22. The two layers 24 and 26 would be similarly shaped and then screwed to one another to provide a complete bellow 22.

In the application shown, the pressure on opposed surfaces of the bellows 22 would be equal. The specific pitch of the convolutions relative to the base of the bellows 22 is not critical. The pitch is dependent upon the displacement and travel of the bellows 22 axially for a particular application and must be sufficient to permit easy withdrawal of an injection molded part whether layer 24 or 26, or both, from an injection mold during fabrication. In a presently preferred form of bellows means 22, the pitch is on the order of 10°–15°.

The inside layer 24 could be formed of metal or plastic or elastomers and have a chemically resistant outside layer 26 of such as PFA or PVDF secured thereto in intimate relationship. The bellows 22 of the present invention could be formed as a single layer plastic member and be used as a protective boot in a chemically caustic environment.

Thus, the subject matter of the invention comprises a first 15 and second housing member 15, a first 24 and second bellows layer 26, and an O-ring. The housing members 15 and bellows layers, 24 and 26, all have annular flanges, 18, 34, and 36, which, in combination with the O-ring, form a seal between the flanges 18 of the housing members 15. The flanges 18 of the housing members 15 have annular recesses having identical pluralities of ridges. The second bellows layer 26 has a plurality of ridges which is complementary to and cooperates with, for instance, the plurality of ridges of the second housing member 15. On the side of the annular flange 36 of the second bellows layer closest to the first housing member 15, the annular groove of the first bellows layer 24 fits snugly within the annular groove of the second bellows layer 26. The second side of the O-ring fits snugly within the annular groove of the first bellows layer 24. The first side of the O-ring has a plurality of ridges which is complementary to and cooperates with, for instance, the plurality of ridges of the first housing member 15. This completes the seal that is formed between the flanges 18 of the first 15 and second housing member 15.

While we have shown a presently preferred embodiment of the present invention, various changes and modifications will be apparent to persons skilled in the art. It is intended to cover in the appended claims all changes and modifications which fall within the true spirit and scope of the invention.

I claim:

1. A fluid pulsation dampener comprising a housing having a chamber adapted to contain a pressurized fluid, a port adapted to be secured to a source of pressurized fluid, a port adapted to be secured to a source of a chemical fluid to be dampened and a bellows secured within said housing for separating said pressurized fluid in the chamber from said chemical fluid to be dampened, said bellows comprised of a body having a relatively thin wall which is open at one end and closed at the other, the wall having a first surface facing the pressurized fluid and a second surface facing the chemical fluid to be dampened, said wall formed as a spiral groove on both said inner and outer surfaces, said bellows further including an annular flange at said open end of said bellows, said annular flange having an annular groove adapted to cooperate with an O-ring and said housing to form a seal.

2. The fluid pulsation dampener of claim 1 wherein:
 (a) said housing is further comprised of a first housing member and a second housing member, said first housing member and said second housing member being complementary to each other and having flanges which are opposed, each of said flanges having an annular recess, each of said annular recesses having a plurality of ridges; and
 (b) said annular groove of said bellows having a plurality of ridges that are adapted to cooperate with said plurality of ridges of said first housing member and said second housing member.

3. The fluid pulsation dampener of claim 2 further comprising an O-ring, said O-ring having a first surface and a second surface, said first surface having a plurality of ridges and cooperating with said annular recess of said first housing member, said second surface cooperating with said annular groove of said annular flange of said bellows whereby a seal if formed between said flanges of said first housing member and said second housing member due to contact between (1) said plurality of ridges of said annular recess of said first housing member contacting said first surface of said O-ring; (2), the second surface of said O-ring contacting said annular groove of said annular flange of said bellows; (3) said plurality of ridges of said annular flange of said bellows contacting said plurality of ridges of said second housing member.

4. A fluid pulsation dampener comprising:
 (a) a housing having a chamber adapted to contain a pressurized fluid and said housing having a means to be in communication with a source of fluid to be dampened, said housing being comprised of a first housing member and a second housing member, said first housing member and said second housing member being complementary to each other and having opposing flanges, each of said flanges having an annular recess, each of said annular recesses having a plurality of ridges; and (b) a bellows member secured to said housing to separate said pressuized fluid from said fluid to be dampened, said bellows member comprising a first bellows layer and a second bellows layer, said first bellows layer being comprised of a relatively thin first wall and being open at one end and closed at the other, said first wall having an inner surface and an outer surface, said first wall formed as a spiral groove on both said inner and outer surfaces, said second bellows layer being comprised of a relatively thin second wall and being open at one end and closed at the other, said second wall having an inner surface and an outer surface, said second wall formed as a spiral groove, said first bellows layer being screwed into said second bellows layer whereby the inner surface of said second bellows layer essentially encapsulates said outer surface of said first bellows layer.

5. The fluid pulsation dampener of claim 4 wherein said second bellows layer further comprises an annular flange at said open end adapted to cooperate with said second housing member, said annular flange having an annular groove adapted to cooperate with said annular recess of said second housing member, said first bellows layer further comprises an annular flange at said open end adapted to cooperate with a second surface of an O-ring, a first surface of said O-ring adapted to cooperate with said annular recess of said second housing member.

6. The fluid pulsation dampener of claim 5 further comprising an O-ring, said O-ring having a first surface and a second surface, said first surface having a plurality of ridges and cooperating with said annular recess of said first housing member, said second surface cooperating with said annular groove of said annular flange of said first bellows layer whereby a seal if formed between said flanges of said first housing member and said second housing member due to contact between (1) said plurality of ridges of said essentially annular groove of said first housing member, which contacts said first surface of said O-ring; (2) the second surface of said O-ring contacting said annular groove of said annular flange of said first bellows layer; (3) said plurality of ridges of said annular flange of said second bellows layer contacting said plurality of ridges of said second housing member.

* * * * *